United States Patent [19]
Haugen

[11] 3,780,773
[45] Dec. 25, 1973

[54] CLOSURE FOR MULTIPLE PASSAGE CONDUIT

[76] Inventor: Sverre R. Haugen, Lanesboro, Minn. 55949

[22] Filed: June 17, 1971

[21] Appl. No.: 153,965

[52] U.S. Cl.......................... 138/89, 52/19, 52/421, 138/96, 174/66
[51] Int. Cl................................................ F16l 57/00
[58] Field of Search.................... 138/89, 96 X, 115, 138/116, 117; 52/19 X, 421 X; 220/42 B; 174/66 X

[56] References Cited
UNITED STATES PATENTS

| | | | |
|---|---|---|---|
| 3,065,767 | 11/1962 | Topf | 138/89 |
| 2,045,033 | 6/1936 | Kissinger | 52/421 |
| 3,543,457 | 12/1970 | Budlong | 52/20 X |
| 3,621,623 | 11/1971 | Downes | 138/96 X |
| 3,104,681 | 9/1963 | Gray Jr. | 138/96 |

Primary Examiner—William F. O'Dea
Assistant Examiner—Peter D. Ferguson
Attorney—G. A. Ellestad

[57] ABSTRACT

Closures for the respective male and female ends of a conduit are releaseably held on the conduit by frictional engagement with parts carried by the conduit. The closure for the recessed or female end of a multiple passage underground conduit is provided by a dish-shaped member which is formed of plastic sheet material. A plurality of projections extend downwardly from the bottom of the member and are positioned, respectively, in the ends of the passages. A peripheral skirt extending upwardly from the bottom of the member fits snugly in friction—tight engagement with the inner wall of the recessed end of the conduit. The other or male ends of the conduit may be closed by a similar dish-shaped member having projections extending upwardly from the bottom of the passages. A peripheral skirt also extends upwardly and frictionally engages a gasket carried from the outer side of the male end portion of the conduit.

3 Claims, 7 Drawing Figures

PATENTED DEC 25 1973 3,780,773

INVENTOR.
SVERRE R. HAUGEN
BY *G. A. Ellestad*
ATTORNEY

CLOSURE FOR MULTIPLE PASSAGE CONDUIT

BACKGROUND OF THE INVENTION

This invention relates to underground protective conduits for telephone and electrical cables and the like. One commonly used conduit unit is made of cement and is provided with a plurality of cable receiving passages extending through the conduit from the recessed or female end to the smaller male end of the unit. The units are assembled in a ditch in end-to-end relation with the smaller male end positioned in the larger recessed end and with a tight fit provided by a rubber gasket which extends around the outer side of the male end. During the construction of a conduit when the work is stopped for a period of time, such as at the end of a work day, it is necessary to cover the exposed ends of the conduit passages in order to prevent the entry of water, dirt and other foreign matter. Sometimes a conduit will terminate in the cement wall of a manhole where various cable installations, connections and extensions may be made from time to time. In such cases it is necessary to provide a more or less permanent closure for the exposed openings in the multiple passage conduit which are not in use. Such temporary and semi-permanent closures are manually provided by driving plugs into the several exposed conduit openings. This is a time consuming procedure which does not always provide tight closures for the openings and makes withdrawal of the plugs a somewhat laborious and difficult task.

SUMMARY OF THE INVENTION

Objects of this invention are to provide a closure for a multiple passage conduit of the type described which will be relatively simple in structure, easy to manufacture and efficient and convenient in use.

According to the invention, a closure is provided by a dish-shaped member which is vacuum formed of a suitable plastic sheet material. The bottom of the member has a plurality of spaced projections which are adapted to be positioned, respectively, in the ends of the several passages of a conduit with the sides of the projections being tapered to fit into the tapered ends of the passages. Extending from the bottom is an integral peripheral skirt which is adapted to be in friction-tight engagement with parts carried by the conduit for releaseably holding the closure on the conduit. The closures for the respective male and female ends of the conduit are specifically different in that the closure for the male end has its projections and skirt all extending away from the bottom of the member in the same direction namely, upwardly as described in the specification. The closure for the female end has its projections and skirt extending away from the bottom in opposite directions with the projections extending downwardly and the skirt extending upwardly, as described in the specification. The closures for both conduit ends have integral handle portions extending laterally from the skirts for use in removing the closures from a conduit.

DESCRIPTION OF PREFERRED EMBODIMENTS

Figure 1:
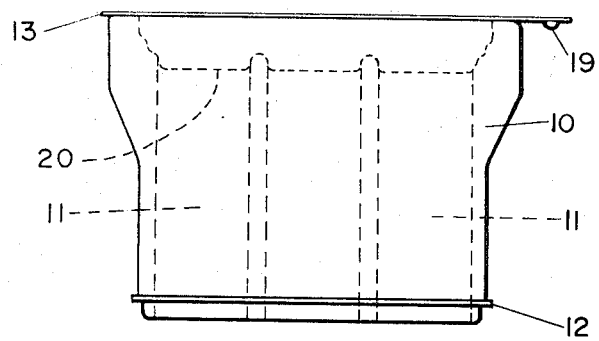
FIG. 1 is a front elevation of a conventional conduit with a closure embodying the invention positioned on the upper end thereof.

Preferred embodiments of the invention which are disclosed in the drawings are adapted for application to a conventional concrete conduit 10 for closing the passages 11 at the respective female and male ends of the conduit. Such conduits are buried underground with the conduits in end-to-end relation and with the smaller or male end fitting into the larger recessed or female end so that the aligned passages may receive telephone cables, electric wires and the like. A tight fit between the assembled conduits is provided by a rubber gasket 12 which extends around the outer side of the male end of the conduit. Although the conduits are laid in a generally horizontal position in a ditch, for purposes of description in the specification and claims the recessed or female end of the conduit 10 will be denoted as the upper end. With the closures in position on the conduit, the parts of the closures which extend toward the recessed end will be denoted as upwardly extending while the parts extending toward the smaller or male end of the conduit will be denoted as downwardly extending.

Figure 2:
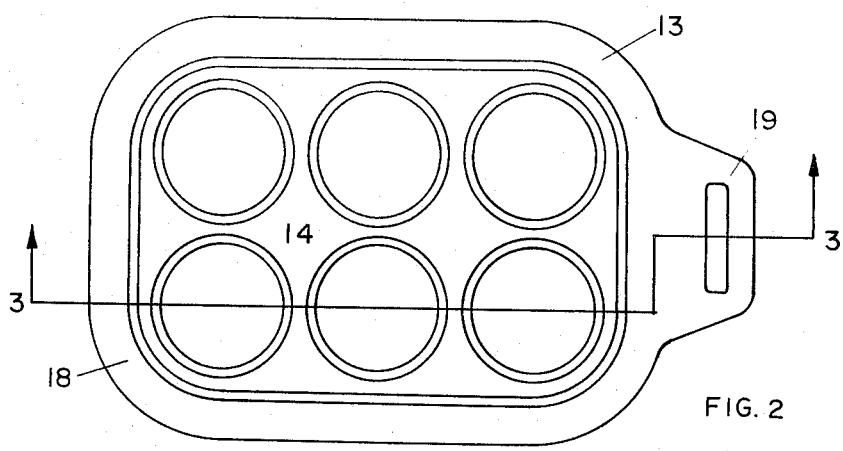
FIG. 2 is a top plan view of the closure which embodies the invention and is used for closing the recessed or female end of the conduit.
Figure 3:
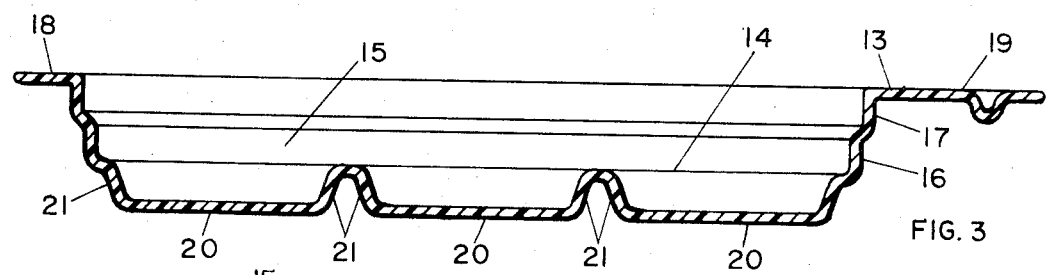
FIG. 3 is a sectional view taken on line 3—3 of FIG. 2.
Figure 4:
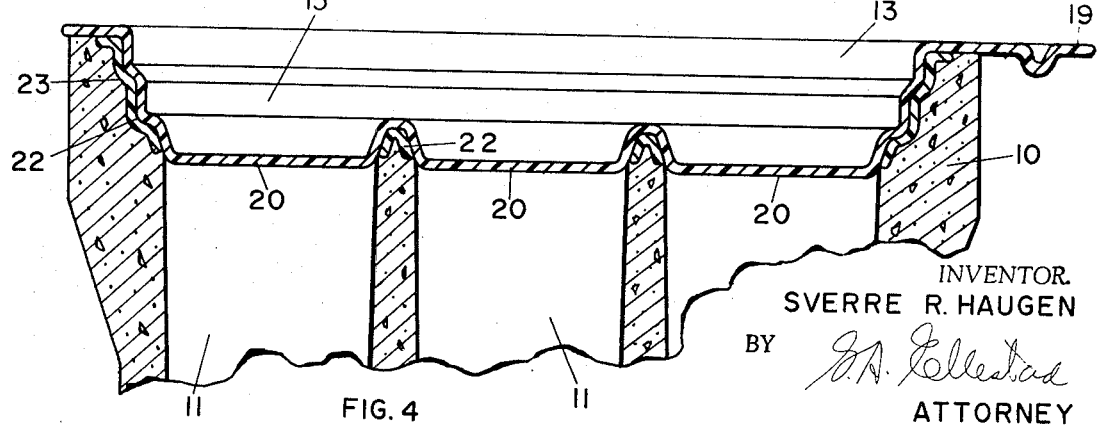
FIG. 4 is a vertical sectional view showing the closure in operative position on the recessed end of the conduit.

The closure 13 for the larger, recessed or female end of the conduit 10 is shown in FIGS. 2-4 as comprising a substantially dish-shaped member having a bottom 14 and an integral peripheral skirt 15 which extends upwardly from the bottom as at 16, thence outwardly and upwardly as at 17 thence laterally to provide a lip 18 having laterally extending handle means 19. Projecting downwardly from the bottom 14 are a plurality of projections 20 which are adapted to be positioned, respectively, in the upper ends of the passages 11 as shown in FIG. 4. The sides of the projections are tapered as at 21 for fitting into the tapered ends of the passages 11 formed in the conduit 10. To provide a smooth construction and a proper fit between parts the concrete conduit 10 is, at the time of its manufacture, provided with a plastic liner or facing 22 around the ends of the passages 11 and the inner wall 23 of the recessed end of the conduit 10. The closure 13 may be produced by a vacuum forming operation on plastic sheet material of suitable characteristics.

The closure 13 is placed in operative position on the recessed end of the conduit by forcing it down so that at least parts of the skirt 15 are in friction-tight engagement with parts of the facing 22 on the inner wall 23 of the conduit. The closure 13 is thusly held firmly in place with the projections 20 positioned, respectively, in the ends of the passages and with the lip 18 overlaying the end of the conduit. An efficient and adequate closure may thereby be easily and quickly applied to all passages at the recessed end of the conduit. The closure 13 may be readily removed from the conduit by pulling upwardly on the handle means 19.

Figure 5:
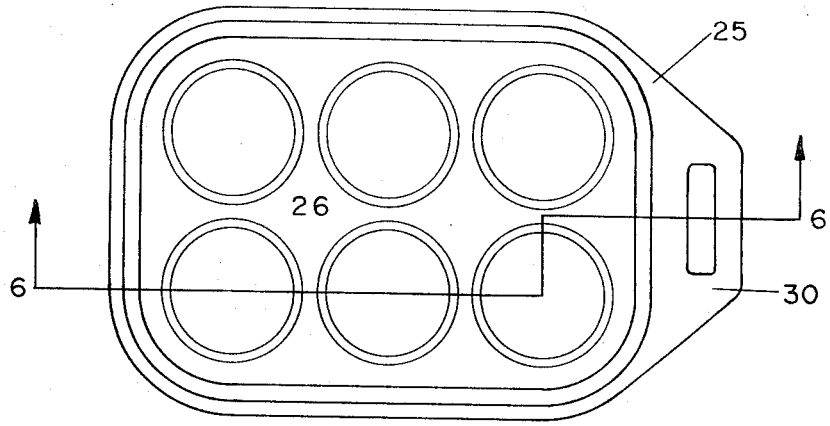
FIG. 5 is a top plan view of the closure which is used on the smaller or male end of the conduit.
Figure 6:
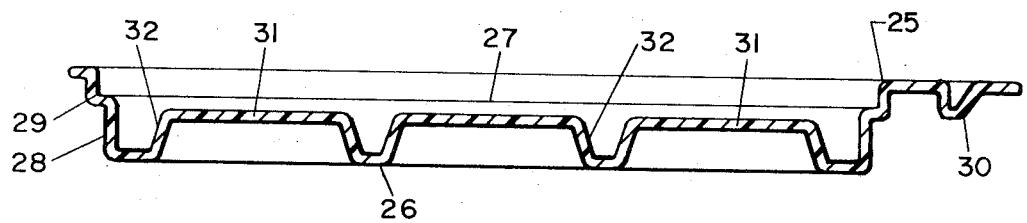
FIG. 6 is a sectional view taken on line 6—6 of FIG. 5.
Figure 7:
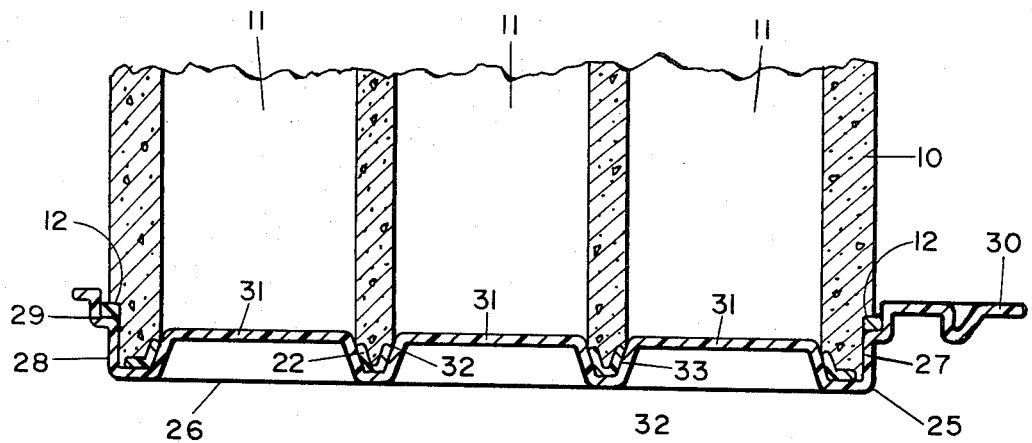
FIG. 7 is a sectional view showing the modified form of closure in operative position on the smaller or male end of the conduit.

The closure 25 for the male or smaller end of the conduit 10 is shown in FIGS. 5–7 as comprising a dish-shaped member having the bottom 26 and an integral peripheral skirt 27 which extends upwardly from the bottom as at 28, thence outwardly and upwardly as at 29. The upper part of the right hand end of the closure 25, as viewed in the drawings, terminates in a laterally extending handle means 30. Projecting upwardly from the bottom 26 are a plurality of projections 31 which are adapted to be positioned, respectively, in the lower ends of the passages 11. During manufacture of the conduit, the areas around the lower ends of passages 11 are also provided with a plastic facing 22.

The closure 25 is placed in operative position on the male end of the conduit 10 by forcing it upwardly so that the projections 31 enter the lower ends of passages 11 and the peripheral skirt 27 makes friction-tight engagement with the rubber gasket 12 carried on the outer side of the lower or male end of the conduit. The closure 25 thereby provides an adequate and efficient protective cover for the lower or male end of the conduit 10. The closure may be easily and quickly applied to the conduit and may be readily removed by pulling downwardly on the handle means 30.

Both closures 13 and 25 may be produced by vacuum forming methods from suitable plastic sheet material. The material is preferably of such type that the peripheral skirts 15 and 27 will be relatively stiff but yieldable to such a degree that the applied closures will be held securely on the conduit yet removable by a strong pull on the handle means. The closures will provide for the ends of the conduit efficient water-tight protective covers which can be readily applied to or removed from the conduits. Thus during the installation of a line of conduit, such as at the end of a work day, the exposed openings of the conduit may be quickly and efficiently closed to prevent the entry of water, dirt or other foreign matter. With a conduit line terminating in the cement wall of a manhold, the passages at the male end of a conduit, for example, will be exposed and open to the entry of water, dirt or other foreign matter. Sometimes considerable time elapses before a cable is installed in a passage and hence it is especially necessary that the exposed ends of the passages be covered to prevent the entry of water, dirt or other foreign matter. When a cable is to be installed, access to a desired passage is made by cutting away its protective projection 31 while the remaining projections will still function as protective covers for the other passages. Other projections are cut away as required for the installation of additional cables. In such a relatively permanent use of the closure 25 it may be desirable to cut off the handle means 30.

From the foregoing it will be apparent that the objects of the invention have been attained by providing a simple yet efficient closure for multiple passage conduits which is releaseably held on the conduit. Various modifications may be made without departing from the spirit of the invention as pointed out in the appended claims.

I claim:

1. The combination of a closure with a conduit having a plurality of spaced passages for the reception of telephone cables or the like and with the ends of the passages tapered wherein said closure comprises a substantially dish-shaped member formed integrally of plastic sheet material, the bottom part of the member having spaced projections positioned respectively in the ends of the passages, the sides of the projections being tapered and fitting into the tapered ends of the passages, an integral skirt extending around the periphery of the member, said skirt extending upwardly from the bottom of the member with parts of the skirt lying in the planes which intersect the plane of the bottom of the member, said skirt terminating in a laterally extending peripheral lip having handle means, at least parts of the skirt being in friction-tight engagement with peripheral means on the conduit whereby the closure is releaseably held in position on the conduit to cover the ends of the passages.

2. The structure recited in claim 1 wherein the projections extend downwardly from the bottom part of the member and the skirt extends upwardly from the bottom part of the member and thence outwardly and upwardly to provide frictional engagement with the inner walls of a recessed portion formed on the upper end portion of the conduit.

3. The structure recited in claim 1 wherein the projections extend upwardly from the bottom part of the member and the skirt extends upwardly from the bottom part of the member and thence outwardly and upwardly and into frictional engagement with a yieldable gasket carried at the outer side of the bottom end portion of the conduit.

* * * * *